UNITED STATES PATENT OFFICE.

TEILE H. MÜLLER, OF YONKERS, NEW YORK.

IMPROVEMENT IN VULCANIZED RUBBER PENCIL-MARK ERASERS.

Specification forming part of Letters Patent No. 122,904, dated January 23, 1872.

*To whom it may concern:*

Be it known that I, TEILE H. MÜLLER, of Yonkers, in the county of Westchester and State of New York, have invented a certain new and Improved Mode of Uniting Wooden, Paper, and other Wrappers or Sheaths with India-Rubber Erasers by the vulcanizing process, of which the following is a specification:

My invention relates to rubber erasers, in which the India-rubber body is combined with a sheath or wrapper of paper, wood, leather, or other material.

My invention is directed to an improved mode of joining the wrapper or sheath to the India rubber in such manner that their union may be effected by and during the process of vulcanizing the rubber body. To this end I take the vulcanizable rubber erasive compound while in the green or plastic state, and, after giving it the shape or approximate shape desired for the finished article, I inclose it in or surround it with a sheath or wrapper of paper, wood, or other material, which is brought in close contact with the soft and sticky exterior of the rubber.

Any suitable wooden sheathing or case may be used. I sometimes employ for the purpose a veneer, which, in order to be wrapped around the rubber without danger of splitting or breaking, should be previously steamed or otherwise softened, so as to be sufficiently pliable.

In case paper or leather is used it may be wrapped around the rubber, having first been coated with rubber cement to make the folds stick together; or it may be first formed into a tube into which the rubber is inserted.

Sheaths of other material may be formed and applied in the above or other ways, depending upon the nature of the particular material employed.

After the application of the sheath or wrapper the article thus prepared is placed in a vulcanizing-mold of the proper shape and construction, as will be understood by those skilled in the art of vulcanizing rubber, and the mold is heated by a surrounding steam-jacket; or it may be placed in a heater, where it is subjected to the requisite degree of heat and for the length of time required to effect the proper vulcanization of the rubber portion of the eraser.

As before stated, the sheath is in contact with the rubber body, and by and during the process of vulcanization there is effected a union of the two so close and intimate as to render it practically impossible for the one to become separated or loosened from the other. It has been usual heretofore to first vulcanize the rubber portion of the eraser and then apply the wrapper and unite the two by means of glue or other like adhesive material. But by my process I apply the wrapper before vulcanization, and then, by one and the same act, vulcanize the rubber and unite it with the sheath; and in addition to that I can impart the finished or perfected shape desired to the exterior of the wrapper; for the latter is by the slight expansion of the rubber brought in contact with the walls of the mold with a pressure sufficient to impress upon it the configuration of the mold, and to give it a high finish.

Ornaments may be engraved in the mold, which can be imprinted or brought out in relief on the exterior of the eraser.

My invention is applicable to all shapes of rubber erasers when the same are provided with wrappers or sheaths. The erasers can be made cylindrical or of other pencil-like form, with a portion of the tubular wrapper projecting at one end beyond the rubber body, so as to fit a lead-pencil or other article on the end of which a tenon is formed, being united with the same by means of any suitable cement or glue or other means.

After the vulcanizing operation above described is completed the sheath may be varnished and finished in any suitable manner.

What I claim as my invention, and desire to secure by Letters Patent, is—

In the manufacture of India-rubber erasers composed of an India-rubber body combined with a wrapper or sheath of wood, paper, leather, or other material, the mode of joining the same together by applying the sheath or wrapper while the rubber is in the green or plastic state, and then uniting the two by and during the act of vulcanizing, as herein described.

In testimony whereof I have signed my name to this specification before two subscribing witnesses.

TEILE H. MÜLLER.

Witnesses:
 ISAAC HIRSCH,
 O. S. GRADY.